United States Patent [19]
Pogonowski

[11] 3,754,780
[45] Aug. 28, 1973

[54] REMOTE CONTROL LOCKING CLAMP FOR DETACHABLY INTERCONNECTING TWO CONCENTRIC ELEMENTS

[75] Inventor: Ivo C. Pogonowski, Houston, Tex.

[73] Assignee: Texaco Inc., New York, N.Y.

[22] Filed: Aug. 30, 1971

[21] Appl. No.: 175,891

[52] U.S. Cl............. 285/18, 285/421, 285/DIG. 13, 285/DIG. 21
[51] Int. Cl............................................. F16l 35/00
[58] Field of Search..................... 285/421, 18, 321, 285/420, DIG. 13, DIG. 21, 141, 144–148; 64/46.5; 287/52.03, 52.04; 294/94, 96

[56] References Cited
UNITED STATES PATENTS

| | | | |
|---|---|---|---|
| 2,009,989 | 7/1935 | Begg | 285/144 |
| 2,839,164 | 7/1958 | Roussel | 61/46.5 X |
| 2,864,450 | 12/1958 | Burns | 285/145 X |
| 3,593,530 | 7/1971 | Pogonowski | 61/46.5 |
| 1,073,850 | 9/1913 | Greer | 285/321 X |
| 3,455,578 | 7/1969 | Hanes | 285/141 X |
| 1,905,324 | 4/1933 | Waters | 285/373 X |
| 2,877,732 | 3/1959 | Eaton | 285/321 X |
| 3,104,905 | 9/1963 | Erdmann et al. | 285/321 X |
| 3,204,991 | 9/1965 | Hauk | 285/321 X |
| 3,250,331 | 5/1966 | Boyle | 285/321 X |
| 3,603,619 | 9/1971 | Bengesser | 285/321 |

FOREIGN PATENTS OR APPLICATIONS

| | | | |
|---|---|---|---|
| 183,874 | 5/1963 | Sweden | 287/52.04 |

*Primary Examiner*—Dave W. Arola
*Attorney*—Theron H. Nichols

[57] ABSTRACT

A remote control retractable locking clamp for detachably telescopically connecting a template cylindrical element of an offshore drilling tower with a subsurface structural cylindrical inner pile element, including an elongated circular clamp with tapered overlapping ends positioned between the two cylindrical elements and encircling the pile element. The clamp ends are hook shaped so that the pushing in of a tapered pin therebetween with a reversible motor remotely controlled on the surface increases the overlap and accordingly causes the clamp to grip the outer sleeve element for detachably locking the sleeve to the pile. Pulling out of the tapered pin causes contraction of the clamp for unlocking the sleeve from the pile.

15 Claims, 11 Drawing Figures

Patented Aug. 28, 1973    3,754,780

REMOTE CONTROL LOCKING CLAMP FOR DETACHABLY INTERCONNECTING TWO CONCENTRIC ELEMENTS

OBJECTS OF THE INVENTION

The principal object of this invention is to provide a method for detachably locking together two concentric pipes, or a pipe concentric with and encircling a pile.

Another principal object of this invention is to provide several locks or attachment means for carrying out the above method of detachably clamping two concentric or telescopic elements together.

Another object of this invention is to provide a new lock or clamp for encircling the inner pipe of two concentric pipes and between the inner and outer pipes with the ends of the bank hocked shaped and overlapping each other, whereby increased overlapping of the band expands the clamp and locks the two telescopic pipes together.

Another object of this invention is to provide a clamp which comprises a band wrapped around the inner concentric element between the inner and outer elements with overlapping ends whereby the overlapping of the ends may be decreased and which decrease diminishes the gripping force between the band and the two pipes whereby the pipes are released from each other and from the band.

Another object of this invention is to provide a clamping means for interlocking two concentric elements together and which has a second locking means provided between the outer concentric element and a locking band inbetween the two concentric elements.

Still a further object of this invention is to provide a detachable locking clamp which is remotely controlled from atop an offshore drilling tower leg sleeve to a sea bottom structural pile.

Another object of this invention is to provide a remote control locking lcamp for detachably interconnecting two concentric elements that is easy to operate, is of simple configuration, and is economical to form and assemble.

Further objects and various advantages of the disclosed remote control locking clamp for detachably interconnecting two concentric elements will be apparent in the following detailed description, together with the accompanying drawings, submitted for purpose of illustration only and not intended to define the scope of invention, reference being made for that purpose to the subjoined claims.

BRIEF DESCRIPTION OF THE DRAWINGS

The drawings diagramically illustrate by way of example, not by way of limitation, at least one method and several forms of the invention wherein like reference numerals designate corresponding parts in the several views in which.

DESCRIPTION OF THE PREFERRED EMBODIMENTS OF THE INVENTION

The invention disclosed herein, the scope of which being defined in the appended claims, is not limited in its application of the details of construction and arrangement of parts shown and described, since the invention is capable of other embodiments and of being practiced are carried out in various other ways. Also, it is to be understood that the phraseology or terminology employed herein is for the purpose of description and not of limitation.

Figure 1:
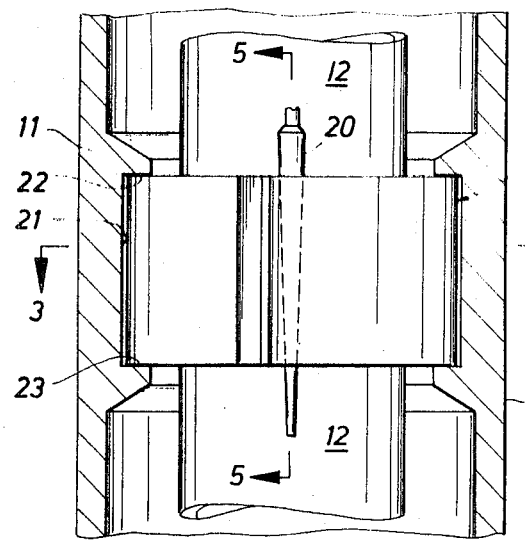
FIG. 1 is a schematic view of a portion of the clamp mounted between two concentric or telescopic elements with parts illustrated in section.
Figure 3:
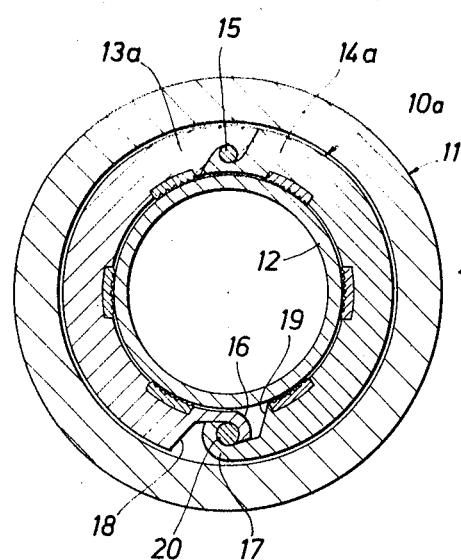
FIG. 3 is a sectional view taken at 3—3 on FIG. 1.

FIGS. 1 and 3 disclosed one embodiment of the invention described hereinafter which comprises a clamp or locking means 10a for detachably clamping two telescopic or concentric pipes, 11 and 12, together. FIG. 1 shows an outer pipe or sleeve of a template sleeve element 11 of an offshore drilling tower (not shown) which is telescopic with a structural pile element 12 in the bottom of the sea. The inner element may be either a tube or solid shaft or pile. Connecting the two elements 11 and 12 together is the new clamp 10a. This clamp comprises, as shown in FIG. 3, two arcuate elements 13 and 14 interconnected together at one of their ends with a pin 15 and with the other two ends 16 and 17 overlapping each other and each being hook shaped. Likewise, each end has a beveled or sloping portion 18 and 19. Between these two hooks is a tapered pin 20 which, when driven into the clamp hook ends 16 and 17, is actuated downwardly as shown in FIG. 1. The overlapping ends 16 and 17 of the clamp are pushed apart to increase the amount of overlap and accordingly tighten the clamp around the inner pipe or shaft and likewise as the ends slide up the sloping portion of each other, they expand against an outer element concentric with the pipe or shaft to thereby lock both concentric elements to the clamp.

Pin 20 may be lubricated with brass inlaids or graphic lubricants for reduction of friction and wear.

The tapered pin 10 is raised up and down by a suitable and conventional reversible motor described further hereinafter. Control lines in the form of wires, hydraulic tubing, or the like, extend from a control counsil on top of the offshore drilling tower down the tower leg to the reversible motor for actuating the tapered pin for detachably locking the bottom of the tubular leg to a pile in the sea bottom.

A second locking means between the outer member and the clamp is illustrated as a groove 21, FIG. 1, with shoulders 22 and 23 in the inner surface of the outer element 11 in which the clamp is actuated or fits.

FIG. 3 likewise illustrates wear or clamping shoes 24 and 25 secured on the internal surface of the clamp by any suitable means.

Figure 2:
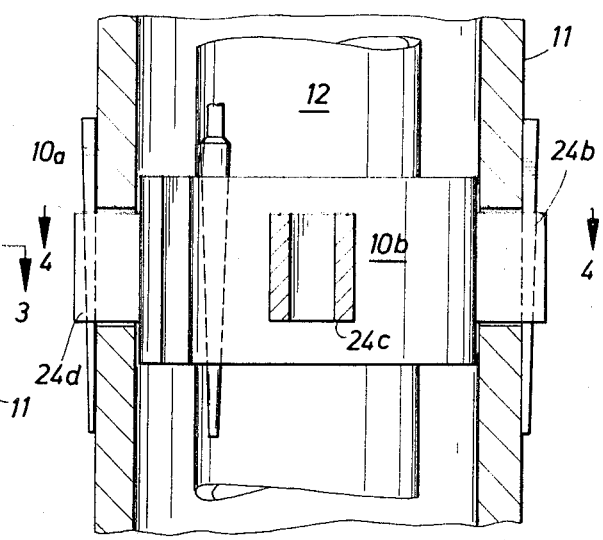
FIG. 2 is a modification of the embodiment of FIG. 1.
Figure 4:
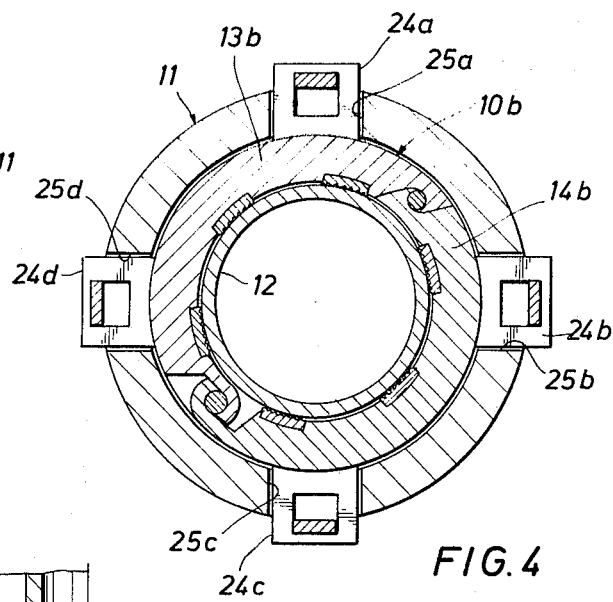
FIG. 4 is a sectional view taken at 4—4 on FIG. 2.

FIGS. 2 and 4 illustrate a modification of FIGS. 1 and 2 wherein the clamp 10b is similarly actuated and expanded by the tapered pin 20 (not shown) being driven downwardly between the two ends 16 and 17 to spread or increase the overlapping distance of the two free ends of the clamp 10b encircling the inner shaft. Likewise, the second locking feature between the outer element 11 and the clamp 10b is illustrated by the projections 24a – 24d which are integral with the clamp and project loosely through corresponding openings 25a – 25d in the outer telescopic and concentric pipe or element 12.

Figure 5:
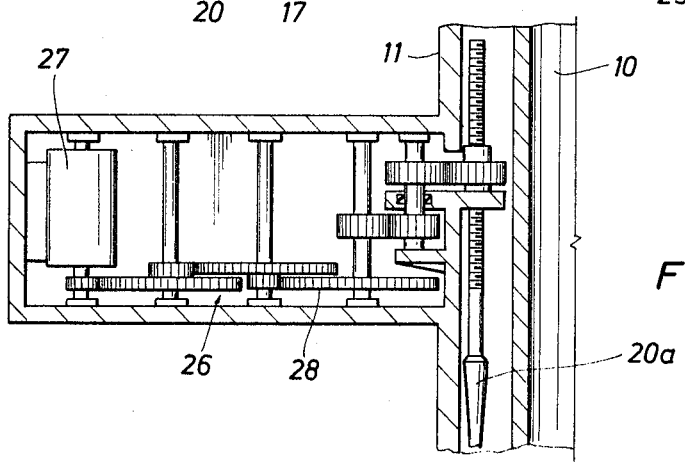
FIG. 5 is a schematic sectional view of a rotary motor and gear train drive means for the detachable clamp tapered pin.

FIG. 5 illustrates in section a typical rotary and gear train means or mechanism 26 for raising and lowering the tapered pin 20a. A motor 27 is reversible for driving a gear train 28 whereby the pin 20a is either actuated downwardly to increase the overlap of the two ends of a clamp to thereby expand the clamp and to thereby lock the two telescopic and concentric elements 10 and 11 to the clamp or the pin may be raised with the rotary motor and thereby decrease the overlap of the ends of the clamp thereby contracting the clamp allowing the resiliency of the clamp to contract the clamp and thus release substantially all friction forces or substantially the greatest friction force between the elements and the clamp.

The motor 27 may be any suitable actuator for the pin 20, such as, but not limited to, a double action hydraulic piston cylinder, or a reversible electric motor operating a jack, or the like.

Figure 6:
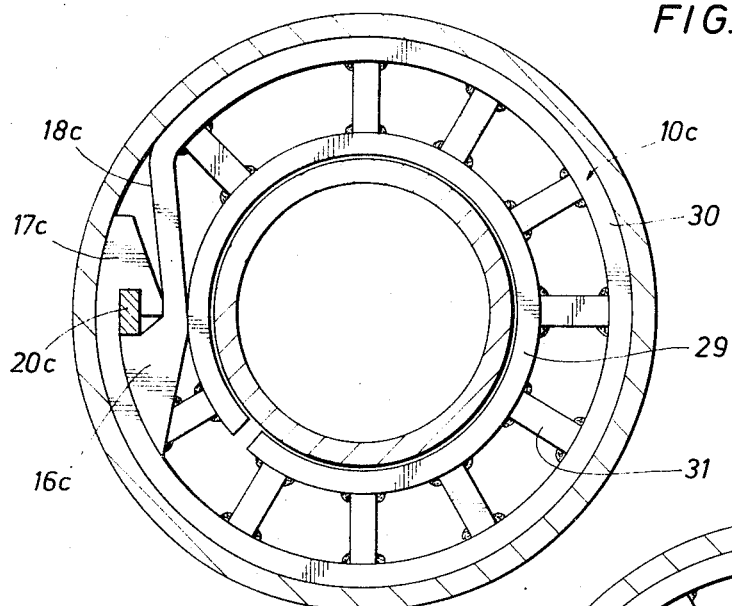
FIG. 6 is a modification of the embodiment of FIGS. 1 and 3.

FIG. 6 discloses a modification of FIG. 3. In this modification the clamp instead of being a solid bar is made up of the two friction portions 29 and 30 connected together in space relationship to each other with spokes 31, or the like. One end 16a of the circular clamp 10c is formed in shape of a hook and adjacently to it is the hook shape of the other end 17a of the clamp. In between the two clamp ends is illustrated a tapered pin 20a whereby movement of the tapered pin in one direction expands or increases the distance between the two ends whereby one end 17a on a tapered surface 18a of the other end 16a thereby expands the two ends that in effect contact and lock together the two concentric elements or pipes 11 and 12. With the pin 20a, FIG. 6 being actuated out from between the two hooked ends 16a and 17a of the clamp, the resiliency of the clamp contracts the two ends whereby the clamp itself in effect contracts thereby releasing the concentric elements from each other.

Figure 7:
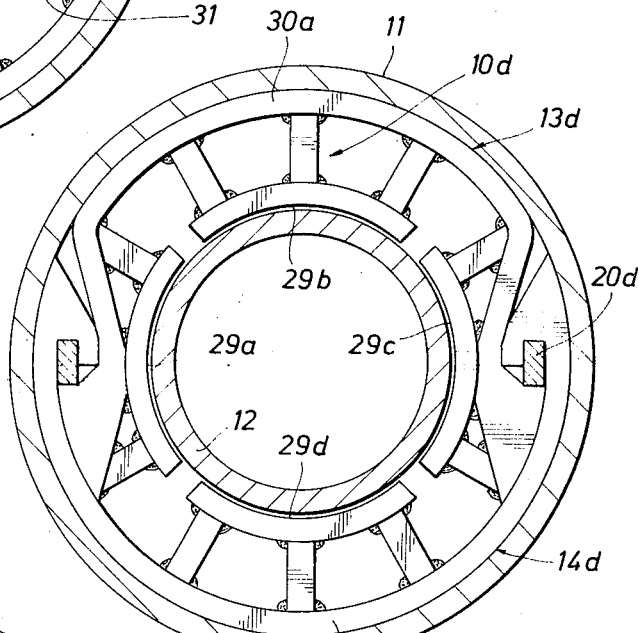
FIG. 7 is a modification of the embodiment of FIG. 3.

FIG. 7 comprises a clamp 10d made up of two arcuate elements 13d and 14d connected together at their ends with two similar tapered pins 20d. Likewise this clamp has a plurality of, or at least four interconnected inner center friction elements 27a to 29d connected to two outer wear or conteacting friction elements 30a and 30b with spokes 31d. The arrangement of three friction elements 32a, 32b, and 32c being mounted on the outer element 14d provides greater flexibility and damping of resonance. Actuation of the two tapered pins either into or out of the hooked ends of this clamp 10d either expands the clamp to lock the two concentric elements 11 and 12 together or the ends of the clamp are actuated toward each other to thereby contract and allow the elasticity of the clamp to contract the clamp thereby releasing or unlocking the two telescopic elements from the clamp and accordingly each other.

Figure 8:
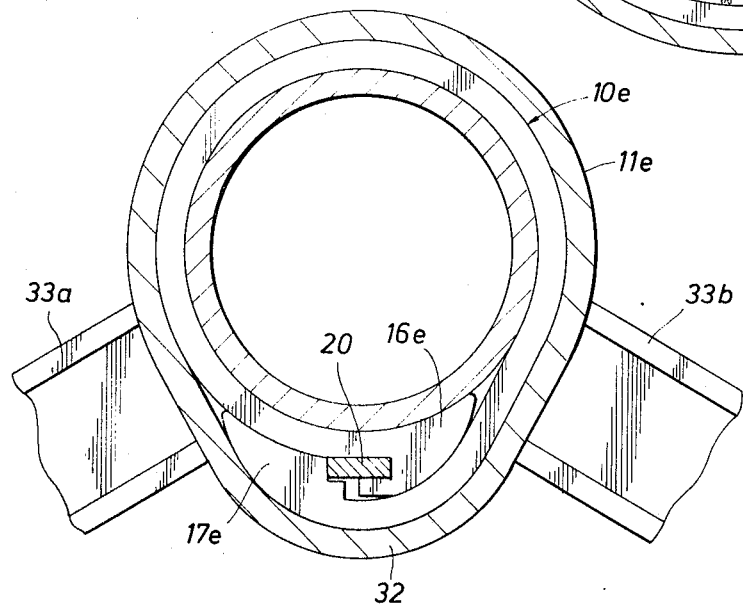
FIG. 8 is a modification of the embodiment of FIG. 3.

FIG. 8 is a modification of FIG. 3 in that it has a deformation 32 in the outer sleeve 11e or concentric element for housing the two ends 16e and 17e of the clamp 16e which are separated by the tapered wedge 20. Legs 33a and 33b are the ends of truss members connected to the pile sleeve.

In operation of the clamp for locking together two concentric or telescopic elements, such as but not limited to a template sleeve element of an offshore drilling tower leg telescopic with a structural pile element in the bottom of the sea. With downward movement of the tapered pin by the reversible actuating motor, the two clamp ends are separated from each other and ride up on the slope of each other thereby expand or filling the space between the inner and the outer concentric sleeves or pipes thus filling the space completely and locking the sleeves to the clamp. With raising of the tapered pin the resiliency of the clamp causes the clamp to contract and permits the ends to move toward each other thereby releasing all frictional clamping action between the clamp and the outer and inner concentric sleeves.

Figure 9:
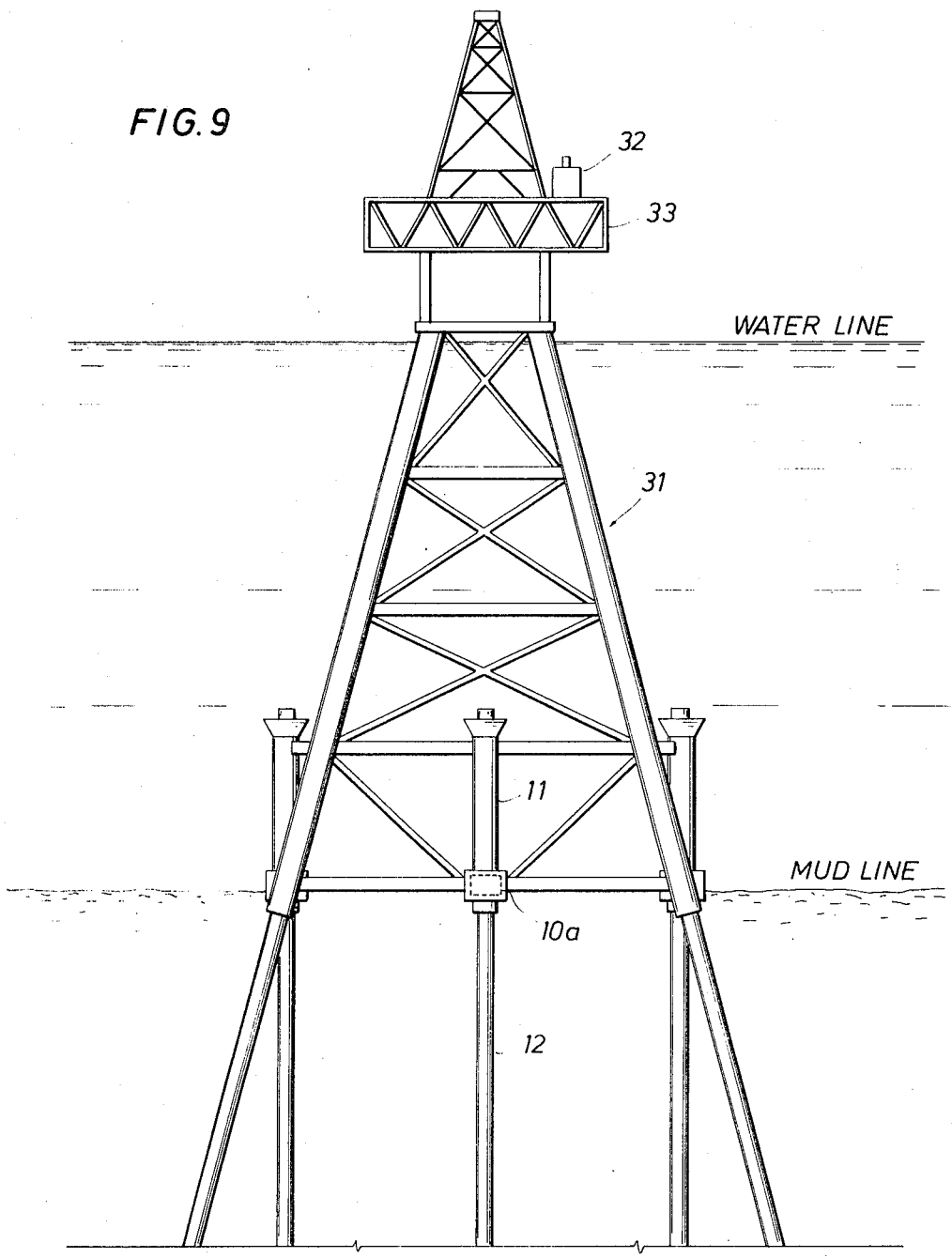
FIG 9 is a modification of the embodiment of FIG. 1 utilizing a reversible reciprocating motor on an offshore drilling tower.
Figure 10:
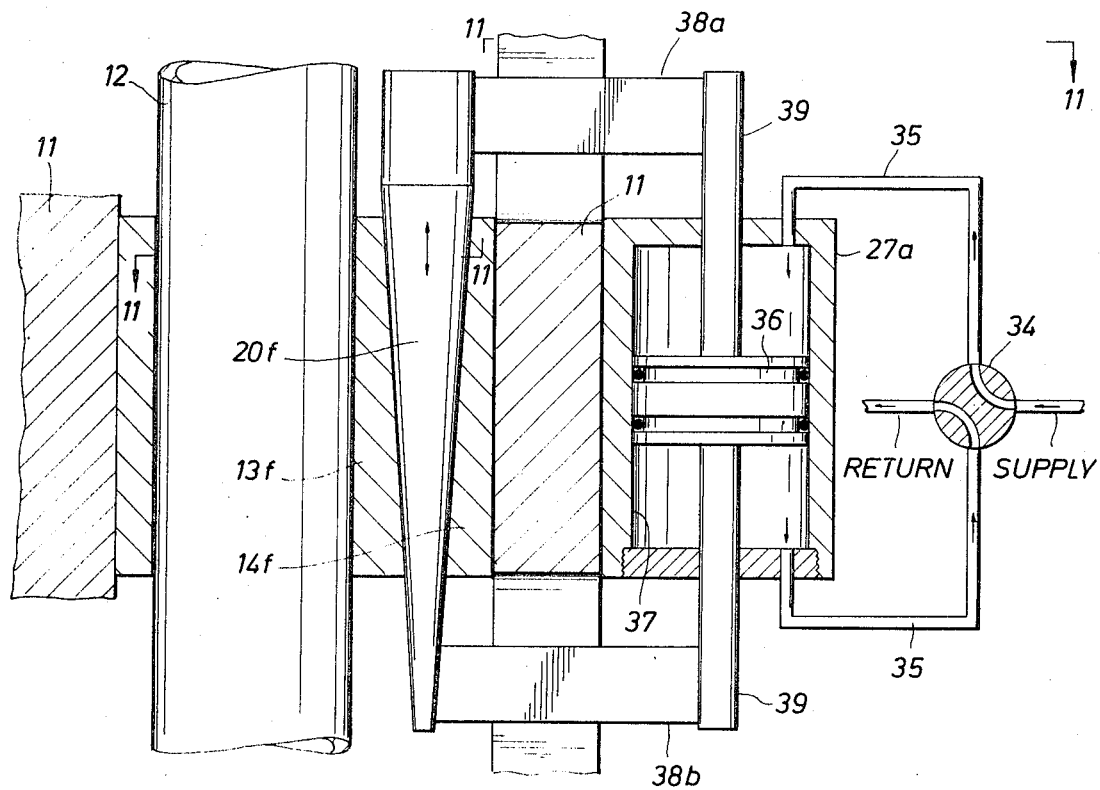
FIG. 10 is a schematic enlarged sectional view of the reversible reciprocal motor of FIG. 9.
Figure 11:
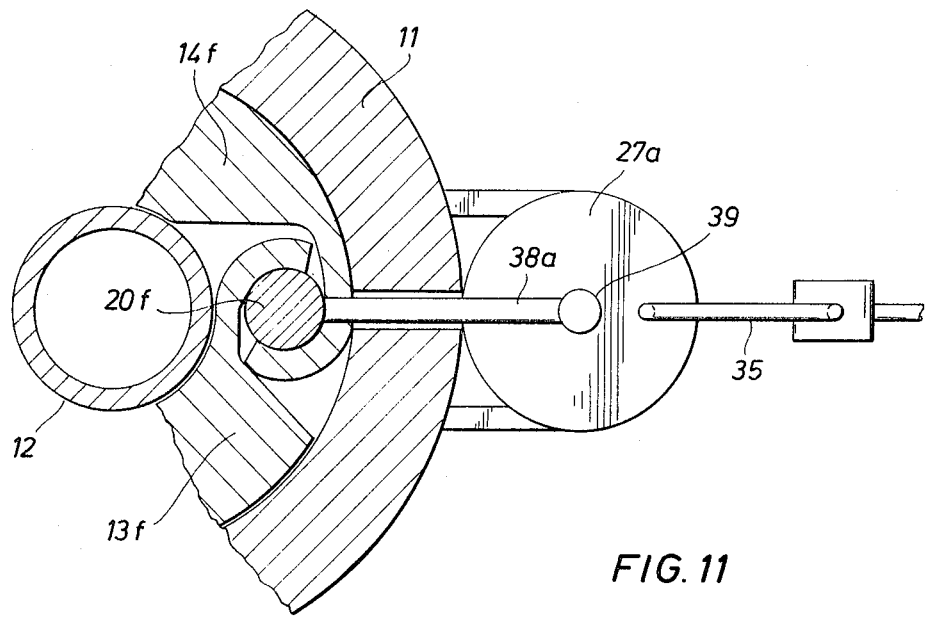
FIG. 11 is a sectional view at 11—11 on FIG. 10.

Reversible electric motors or reversible reciprocating motors, such as hydraulic or pneumatic motors are usually connected between the outer sleeve or telescopic element and the pin for actuation thereof as illustrated in the embodiment of FIGS. 9–11.

FIGS. 9–11 illustrate the locking clamp of FIGS. 1 and 3 as applied to an offshore drilling tower 31, FIG. 9, comprising a conventional eight legged tower with each leg comprising a structural pile 12 driven in the mud bottom with a telescoping template sleeve element 11 connected therearound with the disclosed clamp locking means 10a operated by a conventional reversible reciprocating hydraulic motor 27a, FIG. 10, controlled by a conventional motor control means 32, FIG. 9, on a platform 33 on the tower 31.

FIG. 10 is a detailed view of the conventional reversible hydraulic motor 17a for reversible operation of pin 20f for locking and unlocking of the clamp or arcuate locking elements 13f, 14f for locking template sleeve 11 to pile element 12. Four-way valve 34 is mounted in motor control means 32 on platform 33 for controlling the direction of fluid under pressure through suitable hydraulic lines 35 to a piston 36 operable in a cylinder 37 for actuating the pin 20f up or down by bars 38a and 38b connected between a piston rod 39 and pin 20f.

FIG. 11 is a sectional view at 11—11 on FIG. 10.

The locking clamp 10a, FIGS. 10 and 11, operates similar to clamp 10a, FIGS. 1 and 3, in attaching the offshore drilling tower leg sleeve 11, FIG. 10, to the pile 12 driven in the ocean bottom. Four-way valve 34 in control means 32, FIG. 9, is turned to locking position (as illustrated in FIG. 10) for lowering piston 36 and attached pin 20f for separating the ends of the arcuate locking elements 13f, 14f for expanding the locking elements between the sleeve 11 and pile 12.

Four-way valve 34 in control means 32 is turned 90° counterclockwise to reverse the direction of piston 36 and the attached pin 20f for unlocking tower leg sleeve 11 from the pile 12 by allowing the element ends to approach each other for contracting the locking elements 13f, 14f, between the sleeve 11 and pile 12.

While only a method and five embodiments for carrying out the method of the invention have been shown in the accompanying drawings, it will be evident that various other modifications are possible in the arrangement and construction of the remote control locking clamp elements, without departing from the scope of the invention.

I claim:

1. A method for detachably connecting inner and outer spaced apart telescopic elements comprising,
   a. positioning an inner element telescopically within an outer element,
   b. encircling the inner element with an elongated element with overlapping ends between the inner and outer telescopic elements,
   c. increasing the overlap of the ends of the elongated element by sliding one end over the other end for locking the telescopic elements together, and
   d. decreasing the overlap of the ends of the elongated elements by sliding one end over the other end for unlocking the telescopic elements from each other.

2. A remote control locking clamp comprising,
   a. elongated clamp means having overlapping ends mounted between inner and outer spaced apart telescopic elements,
   b. actuating means for increasing the overlap of said ends for expanding said clamp means against said outer telescopic element and for contracting said clamp means against said inner telescopic element,
   c. said clamp means being responsive to said actuating means for locking said telescopic elements together, and
   d. said clamp means being responsive to said actuating means for decreasing the overlap of said ends for unlocking said telescopic elements from each other.

3. A remote control locking clamp for detachably connecting inner and outer spaced apart telescopic elements wherein the inner element is positioned telescopically within the outer element comprising,
   a. elongated clamp means positioned between said inner and outer telescopic elements and encircling said inner element between said inner and outer elements with overlapping ends,
   b. means for expanding said clamp means,
   c. means for contracting said clamp means,
   d. said means for expanding said clamp means comprising means for increasing the overlap of said ends,
   e. said means for contracting said clamp means comprising means for decreasing the overlap of said ends,
   f. said clamp means being responsive to said expanding means for locking said telescopic elements to each other, and
   g. said clamp means being responsive to said contracting means for unlocking said telescopic elements from each other.

4. A clamp as recited in claim 3 wherein,
   a. said clamp means comprises an elongated clamp encircling said inner element between said inner and outer elements with overlapping ends,
   b. the means for expanding the clamp means comprises a tapered pin means between said overlapping ends,
   c. motor means for actuating said tapered pin between said overlapping ends,
   d. said clamp means being responsive to said tapered pin means for increasing the distance between said overlapping ends for locking said telescopic elements together, and
   e. said clamp means being responsive to said tapered pin means for decreasing the distance between said overlapping ends for unlocking said telescopic elements from each other.

5. A remote control locking clamp comprising,
   a. an elongated clamp positioned between inner and outer spaced apart telescopic elements and encircling the inner element with tapered overlapping ends,
   b. means for increasing the overlapping of said tapered ends for expanding said clamp for locking said telescopic elements together, and
   c. means for decreasing the overlapping of said tapered ends for contracting said clamp for unlocking said telescopic elements from each other.

6. A remote control locking clamp comprising,
   a. inner and outer spaced apart concentric elements,
   b. elongated clamp means having internal and external concentric clamping surfaces mounted between said inner and outer elements,
   c. pin means for increasing the frictional resistance between said internal clamping surface and said inner element and between said external clamping surface and said outer element for locking said concentric elements together,
   d. said pin means comprising means for decreasing the frictional resistance between said external clamping surface and said inner element and between said external clamping surface and said outer element for unlocking said concentric elements from each other,
   e. said elongated clamp means comprises two parts, one end of both parts being hingedly interconnected, and
   f. the other ends of both parts overlap each other so that upon increasing the overlapping of said other ends, the clamp means interlocks the concentric elements together.

7. A remote control locking clamp comprising,
   a. inner and outer spaced apart concentric elements
   b. elongated clamp means having at least two pairs of interconnected spaced apart elongated internal and external concentric clamping surfaces mounted between said inner and outer elements,
   c. each pair of interconnected spaced apart elongated internal and external concentric clamping surfaces has a pair of interconnected hooks,
   d. a tapered pin between each of said hooks of each pair for expanding the effective distance between said internal and external clamping surfaces for increasing the frictional resistance between said internal clamping surface and said inner element and between said external clamping surface and said outer element for locking said concentric elements together,
   e. said tapered pins being pin means for contracting the effective distance between said internal and external clamping surfaces for decreasing the frictional resistance between said internal clamping surface and said inner element and between said external clamping surface and said outer element for unlocking said concentric elements from each other.

8. A remote control locking clamp comprising,
   a. inner and outer spaced apart concentric elements, b. elongated clamp means having internal and external concentric clamping surfaces mounted between said inner and outer elements, c. pin means for increasing the frictional resistance between said internal clamping surface and said inner element and between said external clamping surface and said outer element for locking said concentric elements together, d. said pin means comprising means for decreasing the frictional resistance between said internal clamping surface and said inner element and between said external clamping surface and said outer element for unlocking said concentric elements from each other, e. said elongated clamp means has two overlapping ends, f. each overlapping end being a hook, and g. said pin means comprises tapered pin means for spreading apart said hooks for locking said concentric elements together.

9. A clamp as recited in claim 8 wherein, a. the elongated clamp means has resilience, and b. the means for contracting said clamp means for unlocking said concentric elements from each other comprises contraction of said clamp means after removal of the tapered pin means due to said resilience of said elongated clamp means.

10. A remote control retractable locking clamp comprising, a. an elongated clamping element having internal and external concentric surfaces positioned between a template sleeve element of an offshore drilling tower telscopic with a structural pile element in the bottom of the sea, one of said two telescopic elements being an inner element, and said elongated clamping element encircling the inner element with tapered overlapping ends, b. means for increasing the friction between said internal and external clamp surfaces and the respective pile and sleeve elements for detachably locking said offshore drilling tower template sleeve to said sea bottom structural pile, c. means for decreasing the friction between said internal and external clamp surfaces and the respective pile and sleeve elements for unlocking said offshore drilling tower template sleeve from said sea bottom structural pile, d. said means for increasing the friction comprises means for increasing the overlap of the clamping element ends, and e. said means for decreasing the friction comprises means for decreasing the overlap of the clamping element ends.

11. A clamp as recited in claim 10 wherein, a. the means for increasing the overlap of the clamping element ends comprises a tapered pin actuatable between said ends.

12. A clamp as recited in claim 11 wherein, a. the means for increasing and decreasing the friction comprises motor means for actuating the tapered pin in one direction for increasing the overlap of the clamping element ends for locking the offshore drilling tower template sleeve to said sea bottom structural pile, and b. said tapered pin being actuatable in the other direction by said motor means for decreasing the overlap of the clamping element ends for unlocking the offshore drilling tower template sleeve from said sea bottom structural pile.

13. A clamp is recited in claim 12 wherein, a. said motor means comprises a reversible rotary motor with a gear train connected between the template sleeve and the tapered pin for actuating the pin in either of the two directions for locking and unlocking the clamp.

14. A clamp as recited in claim 12 wherein, a. said rotor means comprises a reversible reciprocating motor connected between the sleeve and the tapered pin for actuating the pin in either of the two directions for locking and unlocking the clamp.

15. A clamp as recited in claim 14 wherein, a. the reversible motor means for actuating the tapered pin being mounted on the drilling tower sleeve, and b. control means on the top of the offshore drilling tower for controlling the reversible motor means for detachably locking the sleeve to the sea bottom pile.

* * * * *